(12) United States Patent
Lauer et al.

(10) Patent No.: US 7,571,831 B2
(45) Date of Patent: Aug. 11, 2009

(54) MOP BUCKET SYSTEM WITH WAVE REDUCTION CAPABILITY

(75) Inventors: Robert W. Lauer, Winchester, VA (US); Stephen M. Batsa, Stephens City, VA (US); Mark Hoyle, Winchester, VA (US); Allen E. Badeau, Morgantown, WV (US)

(73) Assignee: Rubbermaid Commercials Products LLC, Winchester, VA (US)

( * ) Notice: Subject to any disclaimer, the term of this patent is extended or adjusted under 35 U.S.C. 154(b) by 595 days.

(21) Appl. No.: 11/227,443

(22) Filed: Sep. 16, 2005

(65) Prior Publication Data
US 2006/0070202 A1 Apr. 6, 2006

Related U.S. Application Data

(60) Provisional application No. 60/610,206, filed on Sep. 16, 2004, provisional application No. 60/618,175, filed on Oct. 14, 2004.

(51) Int. Cl.
*B65D 25/04* (2006.01)
*B65D 6/34* (2006.01)
(52) U.S. Cl. .................. 220/555; 220/675
(58) Field of Classification Search ........... 220/675, 220/673, 670, 669, 555, 553, 563, 608, 904, 220/532, 530, 529; 15/260, 264, 353; 137/574; D32/53; 210/320
See application file for complete search history.

(56) References Cited

U.S. PATENT DOCUMENTS

| | | | |
|---|---|---|---|
| D28,095 S * | 12/1897 | Mills ..................... D32/53 |
| D28,326 S * | 3/1898 | Joy ....................... D32/53 |
| 664,185 A * | 12/1900 | Stran .................... 220/673 |
| 2,013,577 A * | 9/1935 | Pardee ................ 261/114.1 |
| D107,096 S * | 11/1937 | Rideout ................ D32/53 |
| 2,144,945 A * | 1/1939 | Sutton .................. 220/651 |
| 2,149,255 A * | 3/1939 | Fader ................... 15/263 |
| 2,255,091 A * | 9/1941 | Vaughn ................. 15/260 |
| 2,321,981 A | 6/1943 | Bowers |
| 2,392,208 A * | 1/1946 | Wilken ................. 219/432 |

(Continued)

FOREIGN PATENT DOCUMENTS

EP 0 781 524 A2 7/1997

(Continued)

*Primary Examiner*—Anthony D Stashick
*Assistant Examiner*—Robert J Hicks
(74) *Attorney, Agent, or Firm*—Foley & Lardner LLP (57) ABSTRACT

A mop bucket system includes a liquid-retaining portion and an energy-dissipation device. The liquid-retaining portion is configured to retain liquid. It has a bottom wall portion, a first sidewall portion, a second sidewall portion facing the first sidewall portion, a third sidewall portion, and a fourth sidewall portion facing the third sidewall portion. The liquid-retaining portion permits retained liquid to move in a liquid-movement direction extending from the first sidewall portion toward the second sidewall portion within a higher-momentum region having a width that is approximately 70% of a distance between the third sidewall portion and the fourth sidewall portion. The energy-dissipation device is disposed within the liquid-retaining portion and extends into the higher-momentum region. The energy-dissipation device being configured to inhibit build up of momentum of liquid in the higher-momentum region along at least a portion of the liquid-movement direction by breaking surface tension of the liquid.

27 Claims, 10 Drawing Sheets

U.S. PATENT DOCUMENTS

| | | | |
|---|---|---|---|
| 2,671,239 A * | 3/1954 | Wisner | 15/260 |
| 2,860,809 A | 11/1958 | Perry | |
| 3,009,603 A * | 11/1961 | Stockdale | 206/519 |
| 3,027,041 A * | 3/1962 | Stansbury, Jr. et al. | 220/572 |
| 3,341,876 A | 9/1967 | Campbell | |
| 3,844,441 A * | 10/1974 | Clark | 220/675 |
| 3,935,962 A * | 2/1976 | Schubert et al. | 220/4.21 |
| 3,995,434 A | 12/1976 | Kato et al. | |
| 4,135,530 A * | 1/1979 | Cheney | 134/60 |
| 4,249,666 A * | 2/1981 | Hubert et al. | 215/373 |
| D270,961 S * | 10/1983 | Hawkins et al. | D32/53 |
| 4,827,562 A | 5/1989 | Blase et al. | |
| D305,467 S * | 1/1990 | Dagge | D32/53 |
| D305,948 S * | 2/1990 | Rentz | D32/53 |
| 5,086,917 A * | 2/1992 | Dziersk et al. | 206/216 |
| D350,632 S | 9/1994 | Cummins | |
| 5,346,371 A * | 9/1994 | Bialy et al. | 417/312 |
| D353,241 S * | 12/1994 | Breen | D32/53 |
| 5,397,036 A * | 3/1995 | Maiwald | 222/475 |
| D374,321 S | 10/1996 | Mandell et al. | |
| 5,641,087 A * | 6/1997 | Moffitt | 220/608 |
| D395,531 S * | 6/1998 | Mandell et al. | D32/53 |
| D407,878 S | 4/1999 | Carlson | |
| D408,602 S | 4/1999 | Carlson | |
| 5,971,199 A | 10/1999 | Jackson et al. | |
| D417,051 S * | 11/1999 | Dickinson et al. | D32/53 |
| D426,361 S | 6/2000 | Young | |
| D429,396 S | 8/2000 | Houry et al. | |
| D429,862 S | 8/2000 | Houry et al. | |
| 6,115,877 A | 9/2000 | Morad et al. | |
| 6,220,287 B1 | 4/2001 | Wolf | |
| 6,560,815 B1 | 5/2003 | Brennan et al. | |
| D489,852 S | 5/2004 | Perelli | |
| D495,448 S | 8/2004 | Moforis | |
| 2002/0120997 A1* | 9/2002 | Alt | 15/261 |
| 2003/0217428 A1 | 11/2003 | Perelli | |
| 2005/0252921 A1* | 11/2005 | Van Landingham | 220/608 |

FOREIGN PATENT DOCUMENTS

WO     WO 95/27433 A1     10/1995

* cited by examiner

Fig. 8

MOP BUCKET SYSTEM WITH WAVE REDUCTION CAPABILITY

CROSS-REFERENCE TO RELATED APPLICATIONS

This application claims priority to U.S. Provisional Application Nos. 60/610,206 (filed Sep. 16, 2004) and 60/618,175 (filed Oct. 14, 2004), which are incorporated herein by reference in their entirety.

BACKGROUND

Mop bucket systems are commonly used for cleaning purposes. A mop bucket contains liquid used for cleaning. It is typically used to facilitate the mopping of floors.

With a conventional mop bucket, cleaning liquid may spill or splash during use. For example, often the mop bucket and cleaning liquid must be moved from one location to another. During this movement, the mop bucket will be subjected to differing Newtonian forces. The mop bucket will experience a starting force as it is initially accelerated toward the next location and will experience a stopping force when it reaches that location and is decelerated. Also, while the bucket is being moved, it may experience instantaneous turbulent forces at the interface between the liquid and air, sometimes called wave amplification or ripples. The changing forces on the mop bucket will cause the cleaning liquid to be displaced relative to the mop bucket. The displacement of the cleaning liquid can result in the formation of a wave that splashes over the top of a wall of the mop bucket and out onto a floor or stairway. Also, the amplification of these waves due to the high degree of turbulence may also cause splashing and liquid droplets to exit the mop bucket.

Spillage of the cleaning liquid is problematic. For example, cleaning liquid that has spilled out of the mop bucket onto a floor or stairway create a slip-and-fall hazard if not immediately removed. Even if the liquid is immediately removed, non-productive man hours are required to clean the spill. Spillage also is inefficient and undesirable because it can result in the loss of cleaning liquid.

It would be desirable to have a mop bucket system that reduces the spillage of cleaning liquid.

SUMMARY

An aspect of the present invention relates to a mop bucket system including a liquid-retaining portion and an energy-dissipation device. The liquid-retaining portion is configured to retain liquid. It has a bottom wall portion, a first sidewall portion, a second sidewall portion facing the first sidewall portion, a third sidewall portion, and a fourth sidewall portion facing the third sidewall portion. The liquid-retaining portion permits retained liquid to move in a liquid-movement direction extending from the first sidewall portion toward the second sidewall portion within a higher-momentum region having a width that is approximately 70% of a distance between the third sidewall portion and the fourth sidewall portion. The energy-dissipation device is disposed within the liquid-retaining portion and extends into the higher-momentum region. The energy-dissipation device is configured to inhibit build up of momentum of liquid in the higher-momentum region along at least a portion of the liquid-movement direction by breaking surface tension of the liquid.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Presently preferred embodiments of the invention are illustrated in the drawings. An effort has been made to use the same or like reference numbers throughout the drawings to refer to the same or like parts.

A first embodiment of a mop bucket system 10 according to the present invention is shown in FIGS. 1-5. The mop bucket system 10 includes a liquid-retaining portion 20 and an energy-dissipation device 50. The mop bucket system 10 also can include a wringer 33 and a bucket 34 for receiving dirty water from the wringer 33.

Figure 4:
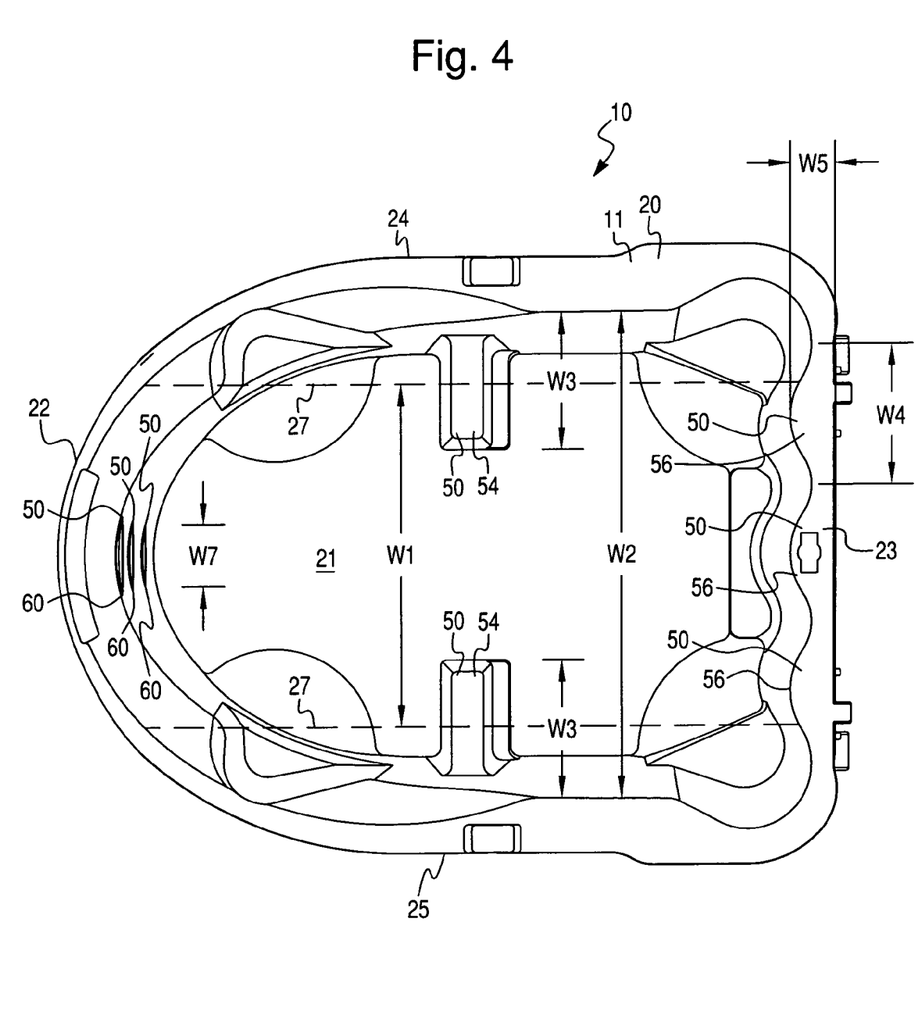
FIG. 4 is a plan view of the mop bucket system of FIG. 1.
Figure 5:
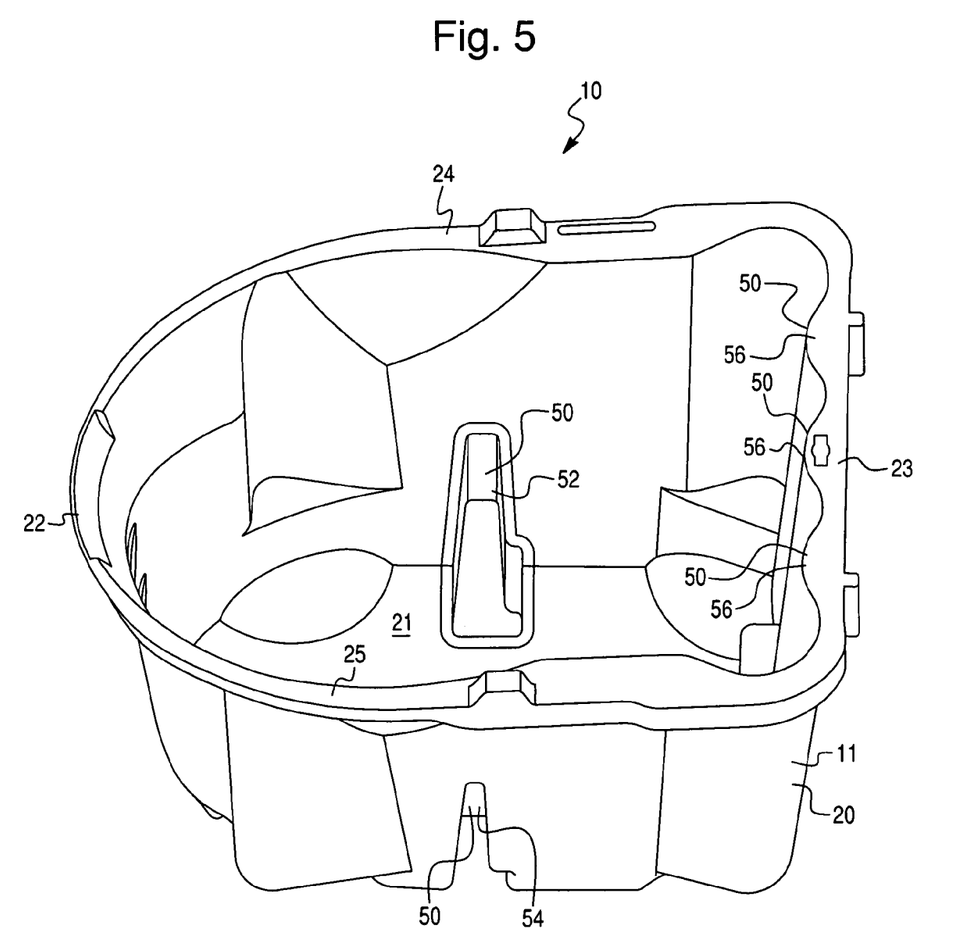
FIG. 5 is side, perspective view of the mop bucket system of FIG. 1.

A mop bucket 11 can provide the liquid-retaining portion 20, which is configured to retain liquid, such as cleaning liquid used to mop floors. Though not as preferred, the liquid-retaining portion 20 could be provided by other container structures, such as drinking cups or mugs, if intended for use in systems other than a mop bucket system. As shown in FIG. 4, the liquid-retaining portion 20 includes a bottom wall portion 21, a first sidewall portion 22, a second sidewall portion 23 facing the first sidewall portion 22, a third sidewall portion 24, and a fourth sidewall portion 25 facing the third sidewall portion 24. The sidewall portions 22, 23, 24, 25 can be connected in a variety of forms. For example, they can be portions of a rounded sidewall with no clear demarcations between the sidewall portions (see, for example, the connection between sidewall portions 22 and 24) or they can be connected by distinct corners or edges that provide clear demarcations between the sidewall portions (see, for example, the connection between sidewall portions 23 and 24).

Figure 3:
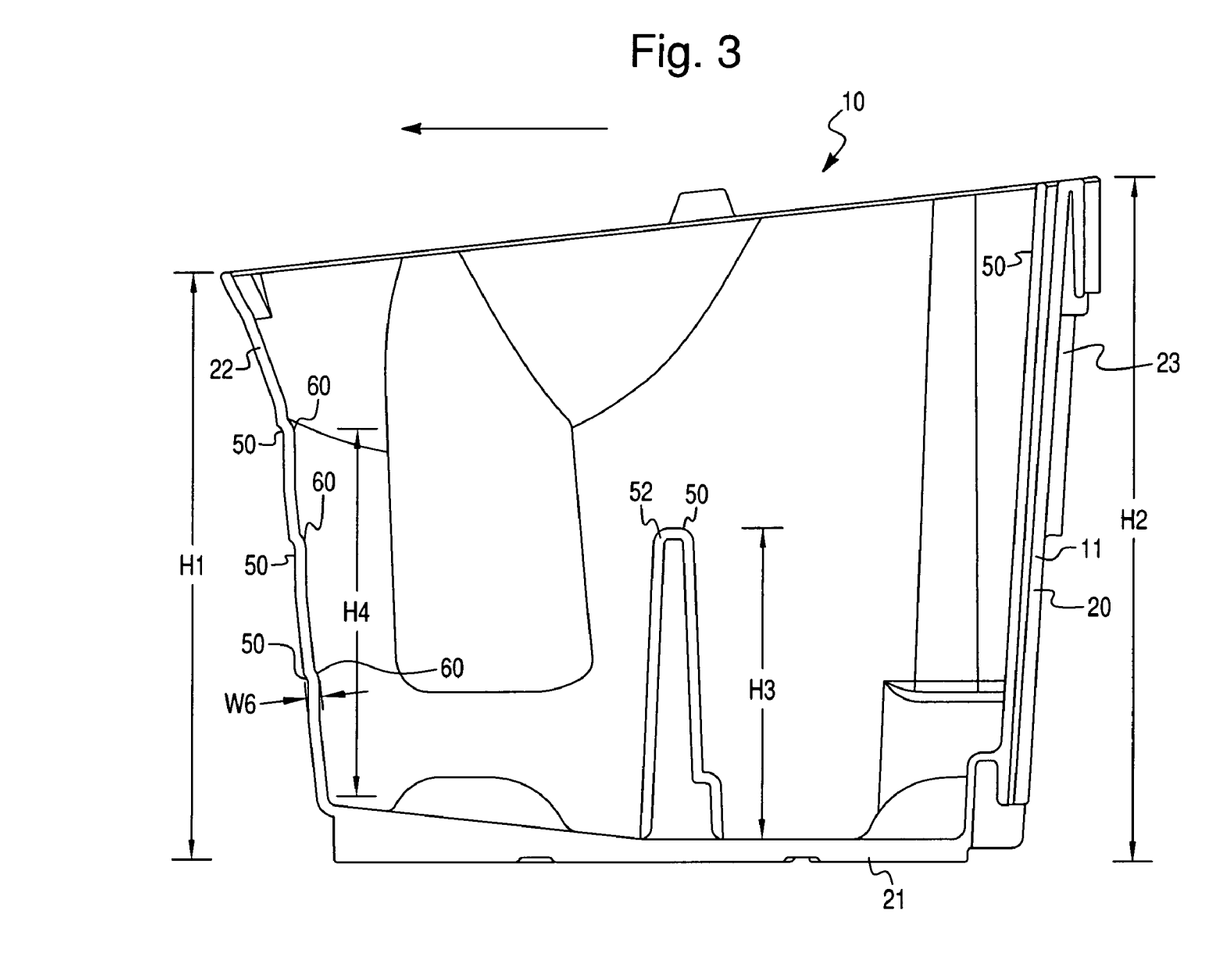
FIG. 3 is a side, cross-sectional view of the mop bucket system of FIG. 1.

The sidewall portions 22, 23, 24, 25 can have approximately the same height. It is more preferred, however, that the first sidewall portion 22 be shorter than the second sidewall portion 23. As shown in FIG. 3, in this preferred embodiment, the first sidewall portion 22 has a height H1 of approximately 12 inches (more preferably 11.98 inches) and the second sidewall portion 23 has a height H2 of approximately 15 inches (more preferably 14.73 inches). The height of the third and fourth sidewall portions 24, 25 tapers between the heights of the first and second sidewall portions 22, 23.

When the mop bucket system 10 is subjected to differing forces, liquid will be displaced relative to the liquid-retaining portion 20. For example, if the mop bucket system 10 is moved in the direction of the arrow A shown in FIG. 3, the liquid (not shown) will move in an opposite direction relative to the liquid-retaining portion 20, i.e., in a liquid-movement direction extending from the first sidewall portion 22 toward the second sidewall portion 23.

Within the liquid-retaining portion 20, the displacement of the liquid will not be evenly distributed. As the liquid-retaining portion 20 stops or starts, the energy of the liquid at the center is greater than along the third and fourth sidewall portions 24, 25, because of the no-slip boundary condition, i.e., forces along the third and fourth sidewall portions 24, 25 will slow the movement of the liquid near those sidewall portions. Consequently, a higher-momentum region will exist in the liquid. For the purpose of defining a location for elements of the energy-dissipation device 50, as explained further below, boundaries of the higher-momentum region have been established by showing dashed lines 27 in FIG. 4, which have a width W1 between them. Thus, the location of the dashed lines 27 and the corresponding width W1 are not intended to necessarily require any specific attribute with regard to the energy or velocity of the liquid. The width W1 preferably is approximately 70% of a distance W2 between the third and fourth sidewall portions 24, 25, though W1 could be redefined as, for example, approximately 65%, 50%, or 30% of the distance W2, depending on the preferred implementation and goals to be achieved. In this preferred embodiment, the higher-momentum region has a center that coincides with the center of the liquid-retaining portion 20.

Figure 1:
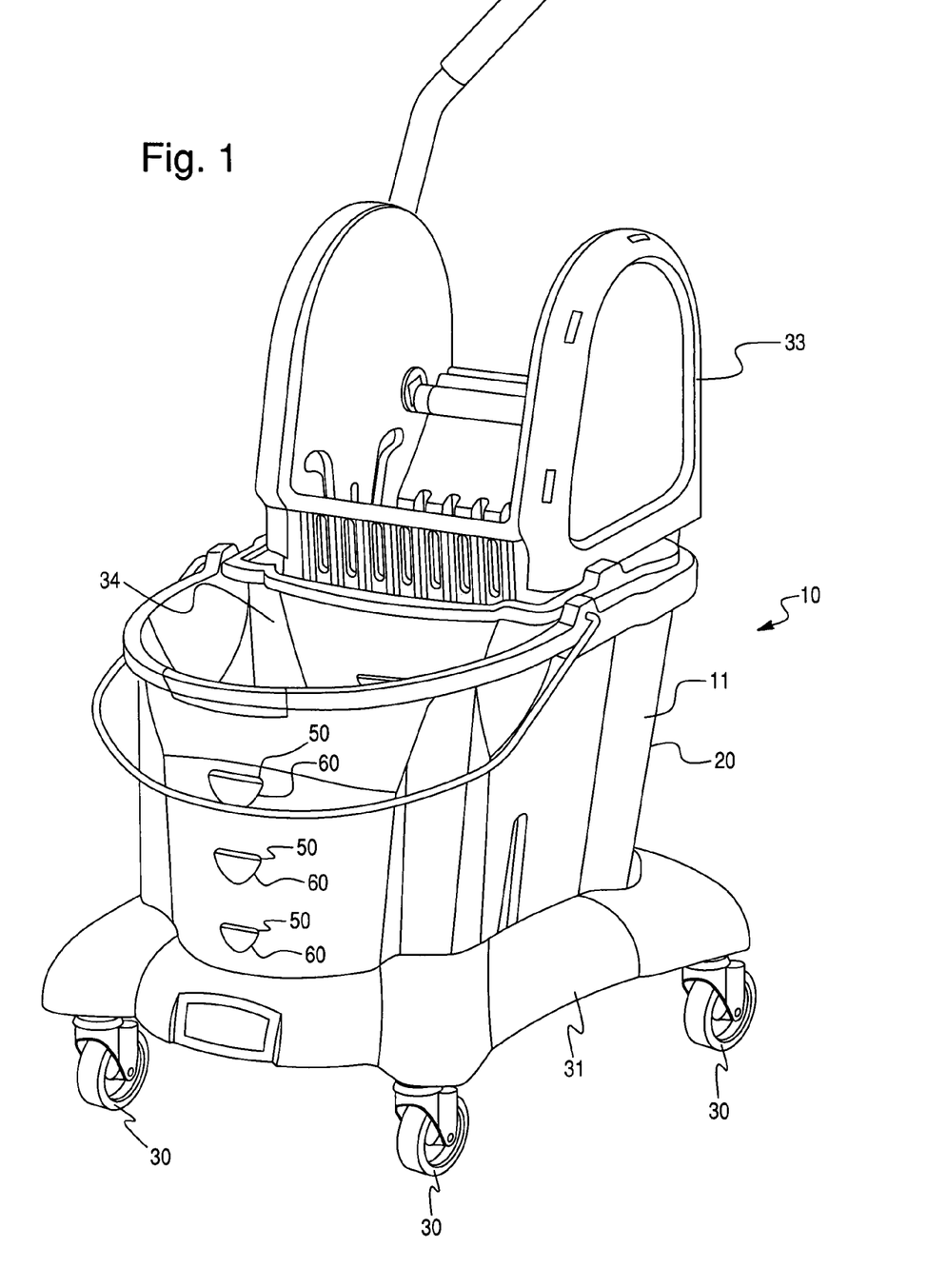
FIG. 1 is a front perspective view of a first embodiment of a mop bucket system according to the present invention.
Figure 2:
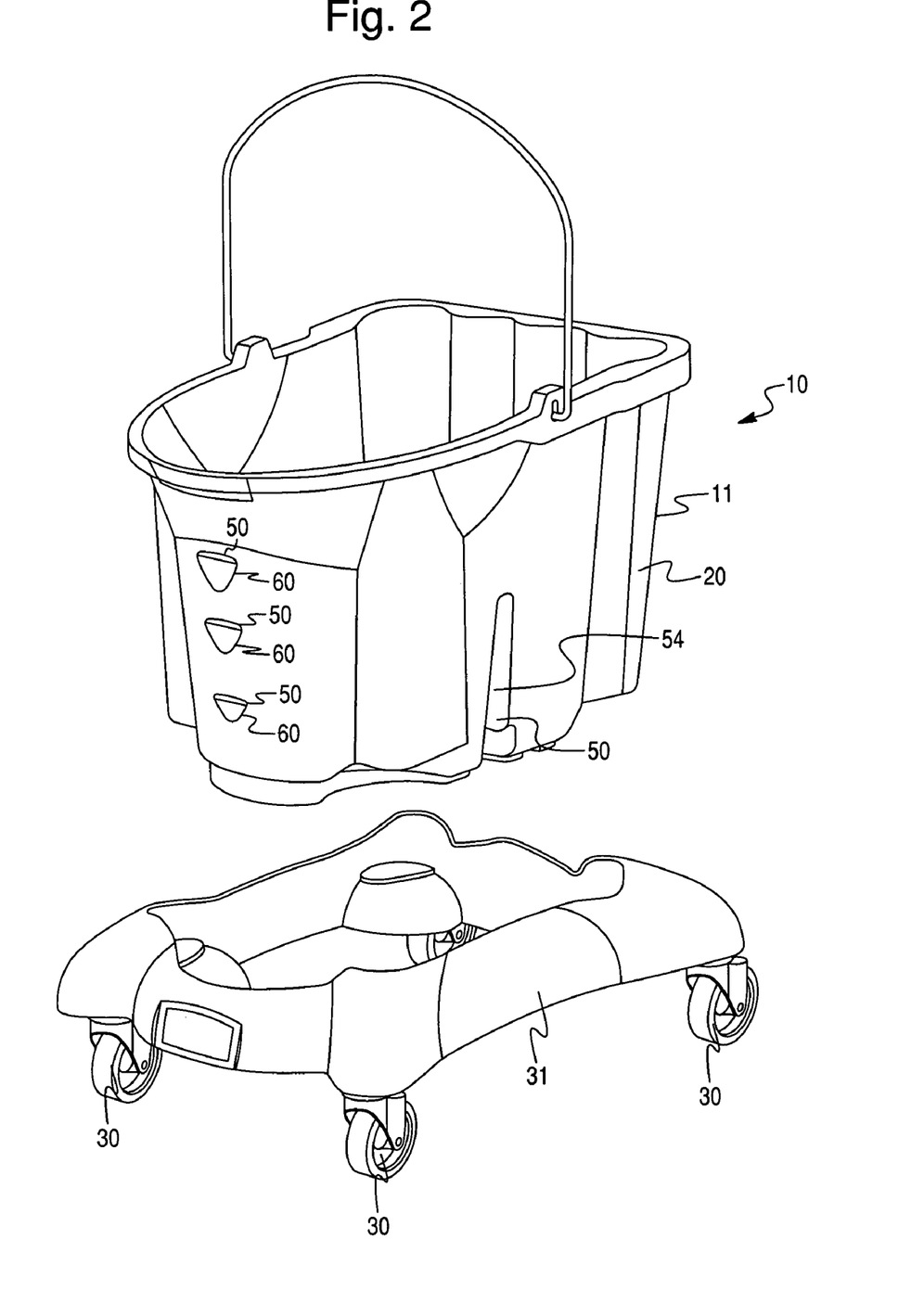
FIG. 2 is a front perspective view of the mop bucket system of FIG. 1.

As shown in FIGS. 1 and 2, the mop bucket system 10 may have rolling members 30, such as casters, to facilitate movement of the mop bucket system 10. The rolling members 30 preferably are connected to a dolly 31, which receives the liquid-retaining portion 20, as shown in the exploded view of FIG. 2. Alternatively, the rolling members can be directly connected to the bottom of the liquid-retaining portion 20. As yet another alternative, the rolling members can be omitted and the mop bucket system 10 could be moved from location to location by carrying the mop bucket system 10.

The energy-dissipation device 50 is disposed within the liquid-retaining portion 20 and extends into the higher-momentum region between the dashed lines 27. The energy-dissipation device 50 can be configured to inhibit build up of momentum of liquid in the higher-momentum region and inhibit wave-amplification at the liquid surface region along at least a portion of the liquid-movement direction by breaking surface tension of the liquid. Under ideal operating conditions, the energy-dissipation device extends above the liquid surface.

The energy-dissipation device 50 can include a first baffle 52 and/or a second baffle 54 disposed between the first and second sidewall portions 22, 23 and within the higher-momentum region. The first and second baffles 52, 54 can be generally planar members that inhibit the flow of liquid. In the disclosed embodiment, the first baffle 52 projects from the third sidewall portion 24 and the second baffle 54 projects from the fourth sidewall portion 25. Preferably, the first and second baffles 52, 54 each project a distance W3 (see FIG. 4) of approximately 2.5 inches (more preferably 2.56 inches) from their respective sidewall portions 24, 25. Preferably the width W3 of a respective baffle 52, 54 is at least approximately 20% of distance W2, more preferably at least approximately 25%, and even more preferably at least approximately 35%. The length of each baffle is preferably less than its width W3, such that the baffle displaces only a small amount of liquid, while providing the desired functionality. It is preferred that the baffles 52, 54 project from their respective sidewall portions 24,25, but they could be spaced, i.e., disposed at a distance, from the sidewall portions.

The first and second baffles 52, 54 are located approximately midway between the first and second sidewall portions 22, 23. This positioning can inhibit build up of momentum of liquid at a location where the highest liquid velocities can occur.

The height of the baffles 52, 54 (and other members that form the energy-dissipation device 50) preferably is configured to extend above the expected liquid-fill height during normal use. Otherwise, if the liquid extends over the baffles 52, 54, they will not break the surface tension of the liquid and their effectiveness will be reduced. Consequently, the first and second baffles 52, 54 preferably extend to a height H3 (see FIG. 3) above a corresponding portion of the bottom wall that is at least 25% (more preferably at least 40%, even more preferably at least 50%, and even more preferably at least 55%) of the height of a shortest of the first, second, third, and fourth sidewall portions 22, 23, 24, 25. The height H3 could be 100% of the height of a shortest of the first, second, third, and fourth sidewall portions 22, 23, 24, 25. In this preferred embodiment, the height H3 preferably is approximately 7 inches (more preferably 6.70 inches).

The baffles 52, 54 can be configured to stop waves before they build up energy or significantly reduce that energy buildup by creating re-circulation zones. The baffles 52, 54 also force the liquid to travel through a resulting gap between the baffles 52, 54, thereby preventing energy buildup through the entire domain. The baffles 52, 54 not only break the surface tension of the liquid, they also can act as stop barriers within the flow. As liquid strikes the baffles 52, 54, the ability of the liquid to retain energy is diminished. Although there is an increased velocity within the gap between the baffles 52, 54, re-circulation zones on each side of the baffles 52, 54 allow the energy to dissipate more quickly than without the baffles 52, 54.

The energy-dissipation device 50 can include projections 56 from the second sidewall portion 23 that are disposed within the higher-momentum region. The projections 56 can be configured to distribute energy from retained liquid over a surface of the second sidewall portion 23. Preferably, the projections 56 increase in width W4 (see FIG. 4) in a direction from the first sidewall portion 22 toward the second sidewall portion 23. Even more preferably, the projections 56 provide a substantially sinusoidal surface along the second sidewall portion 23. In this preferred embodiment, the projections taper to a largest width W4 of approximately 2 inches (more preferably 1.94 inches) and project a distance W5 of at least approximately 1 inch (more preferably 1.12 inches) toward the first sidewall portion 22. The projections can extend to a height above the bottom wall that is at least 25% (more preferably at least 40% and even more preferably at least 50%) of the height of a shortest of the first, second, third, and fourth sidewall portions. In this preferred embodiment, the projections 56 extend along the entire height H2 of the second sidewall portion 23.

The projections 56 from the second sidewall portion 23 allow the energy of the liquid to be effectively distributed over a larger surface area. Thus, as the liquid oscillates in the liquid-retaining portion 20, wave amplification is reduced, which minimizes splashing.

The energy-dissipation device 50 can include wedges 60 on the first sidewall portion 22 that are disposed within the higher-momentum region. The wedges 60 project a distance W6 (see FIG. 3) toward the second sidewall portion that is at least approximately 0.1 inches (more preferably 0.11 inches) and have a width W7 (see FIG. 4) that is at least approximately 1.5 inches (more preferably 1.52 inches). The wedges 60 extend to a height H4 above a corresponding portion of the bottom wall that is at least 25% (more preferably at least 40% and even more preferably at least 50%) of the height of a shortest of the first, second, third, and fourth sidewall portions. In this preferred embodiment, the height H4 is approximately 9 inches (more preferably 8.67 inches).

In this preferred embodiment, the elements of the energy-dissipation device 50, i.e., baffles 52, 54, projections 56, and wedges 60, disposed within the liquid-retaining portion 20 are shown as integral with the mop bucket 11. Though this is preferred, it is not required. For example, those elements of the energy-dissipation device 50 could be formed of structure(s) that are not integrally formed with the mop bucket 11 but instead are connected to the mop bucket 11 or merely placed within the mop bucket 11 without being fixed to it. As a more specific example, a baffle could be connected to only the wringer 33 and extend downward from the wringer 33 into the higher-momentum region.

Figure 6:
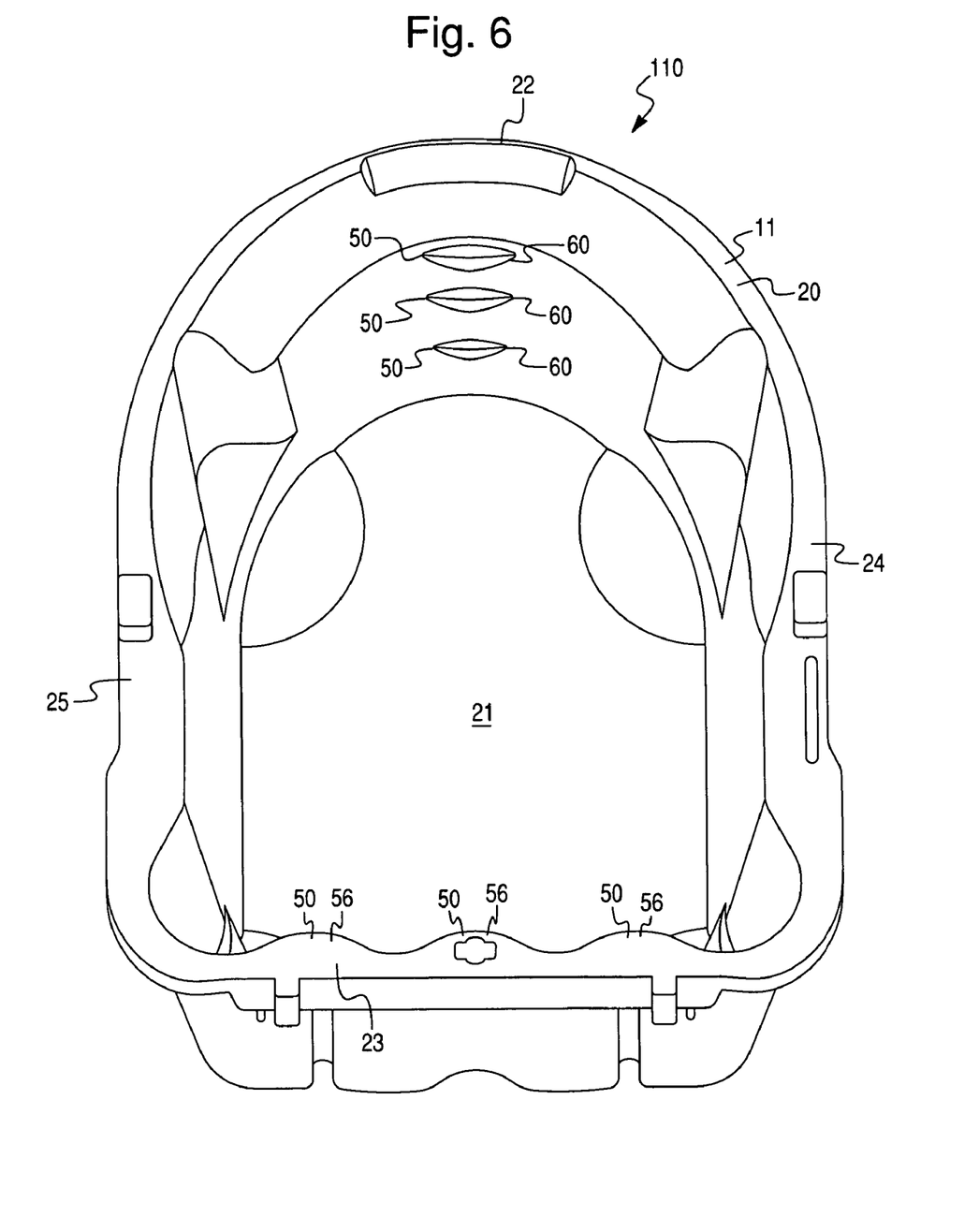
FIG. 6 is a rear, perspective view of a second embodiment of a mop bucket system according to the present invention.

A second embodiment of a mop bucket system 110 according to the present invention is shown in FIG. 6. The mop bucket system 110 is the same as mop bucket system 10, except it does not include the baffles 52, 54.

The theoretical performances of a conventional bucket (Rubbermaid Commercial Products Bucket #7570), the bucket of the first embodiment, and the bucket of the second embodiment (no baffles) were compared using computational fluid dynamics (CFD). The commercially available code Flow-3D® was utilized in the simulations.

The performance of the mop bucket systems was simulated to determine, among other things, the amount of liquid leaving the buckets. The instantaneous and total amounts of liquid leaving the mop bucket systems at any given time permits quantification of the actual performance of mop bucket systems in reducing splashing. To computationally measure this quantity, a simulation was constructed in which a planar field was placed at the top of each mop bucket and, for any quantity of liquid crossing this plane, the volume of liquid was tracked and recorded. The mop bucket system performances were simulated at approximately one-quarter of full capacity and at approximately one-half of full capacity.

Figure 7:
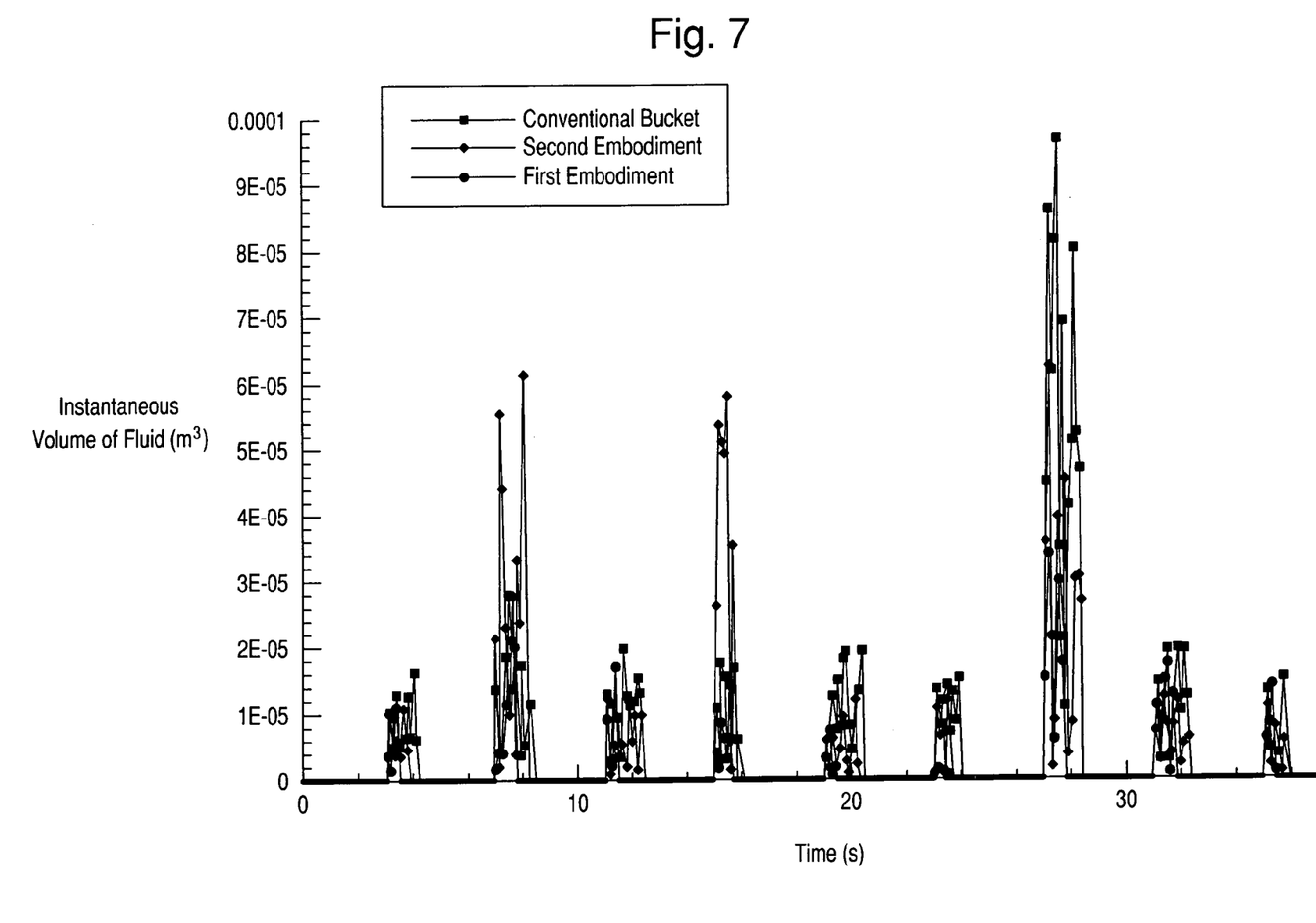
FIG. 7 is graph showing data from a simulation comparing the performance of mop bucket systems at one-quarter of full capacity.
Figure 8:
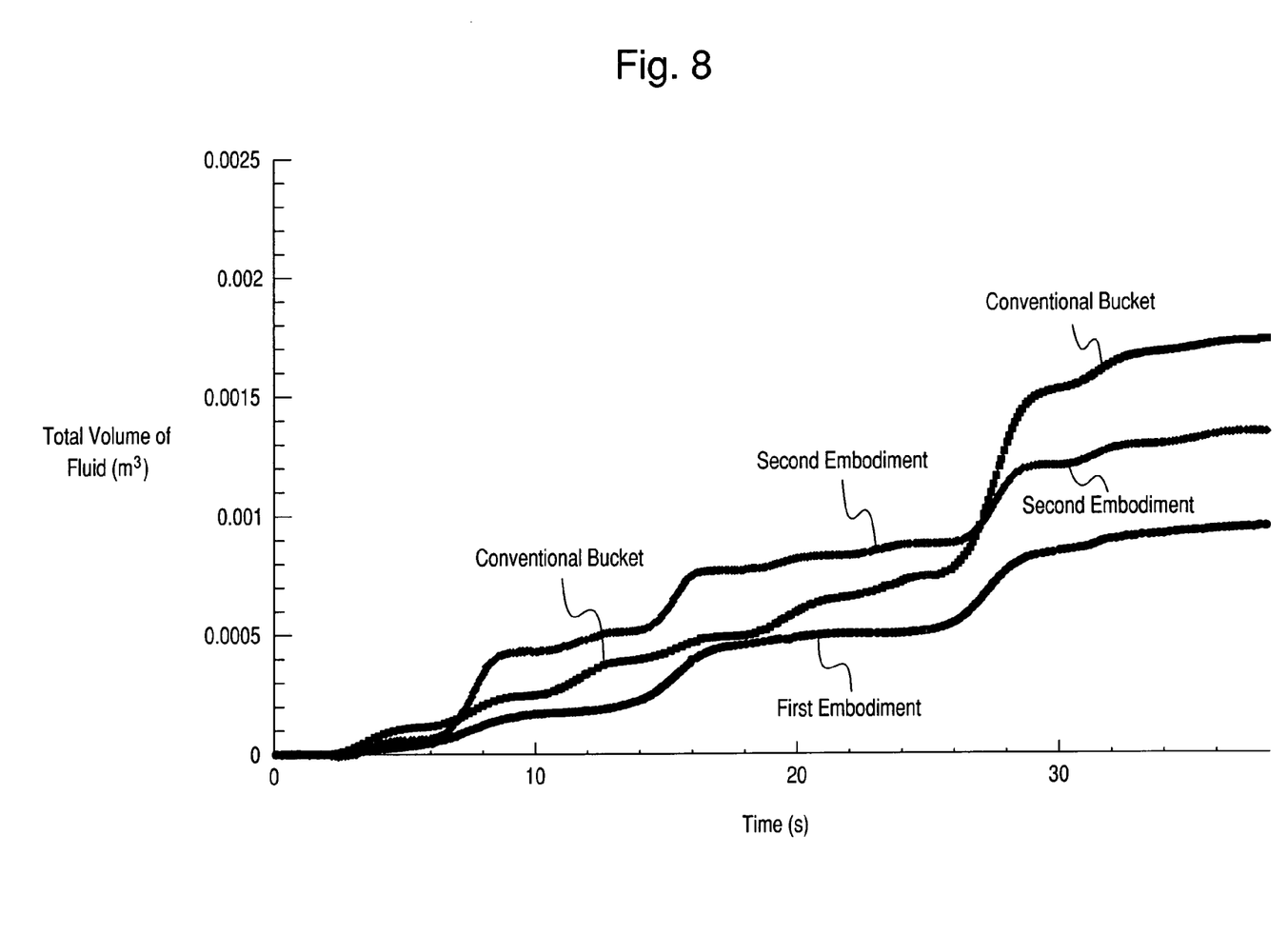
FIG. 8 is graph showing data from a simulation comparing the performance of mop bucket systems at one-quarter of full capacity.
Figure 9:
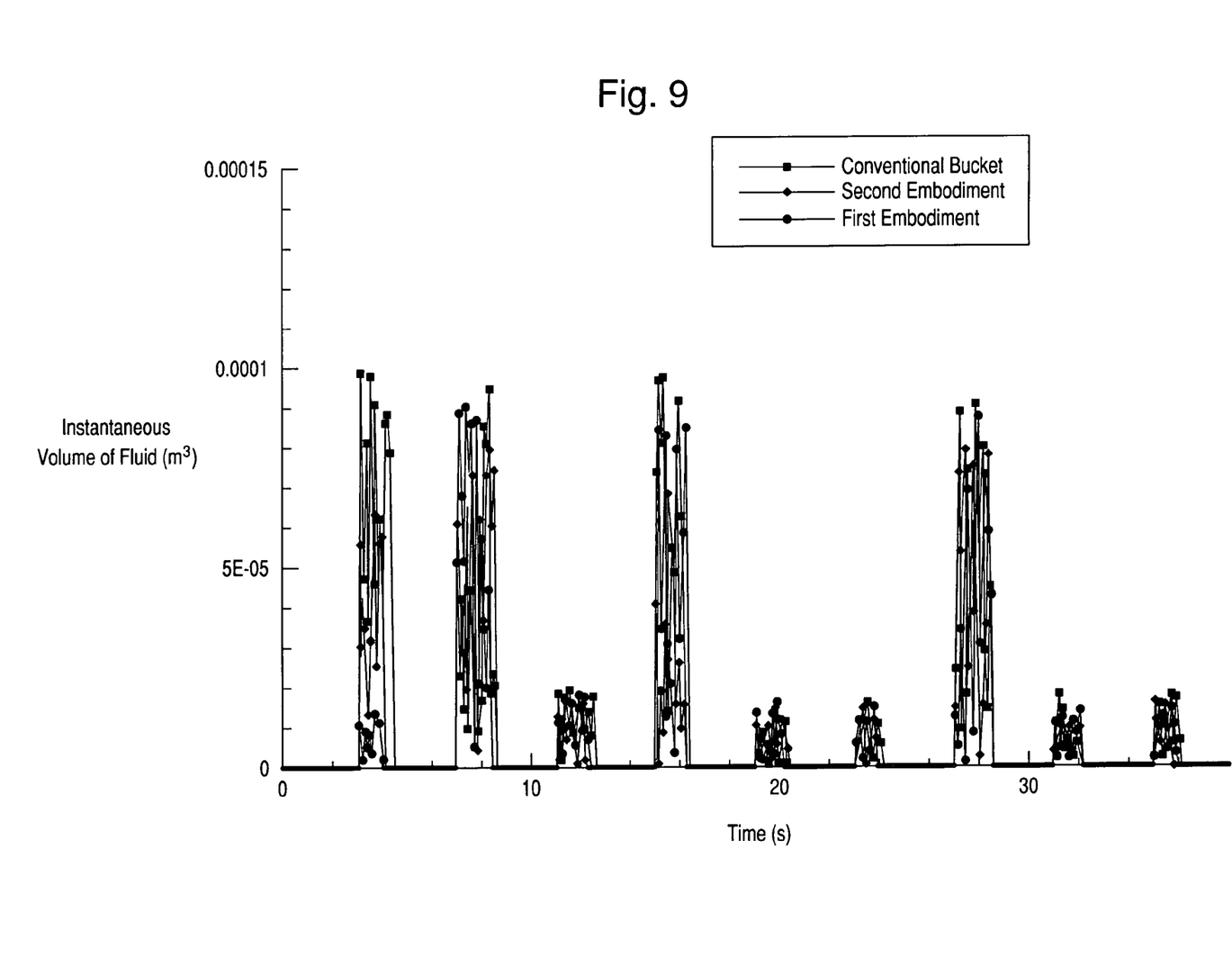
FIG. 9 is graph showing data from a simulation comparing the performance of mop bucket systems at one-half of full capacity.
Figure 10:
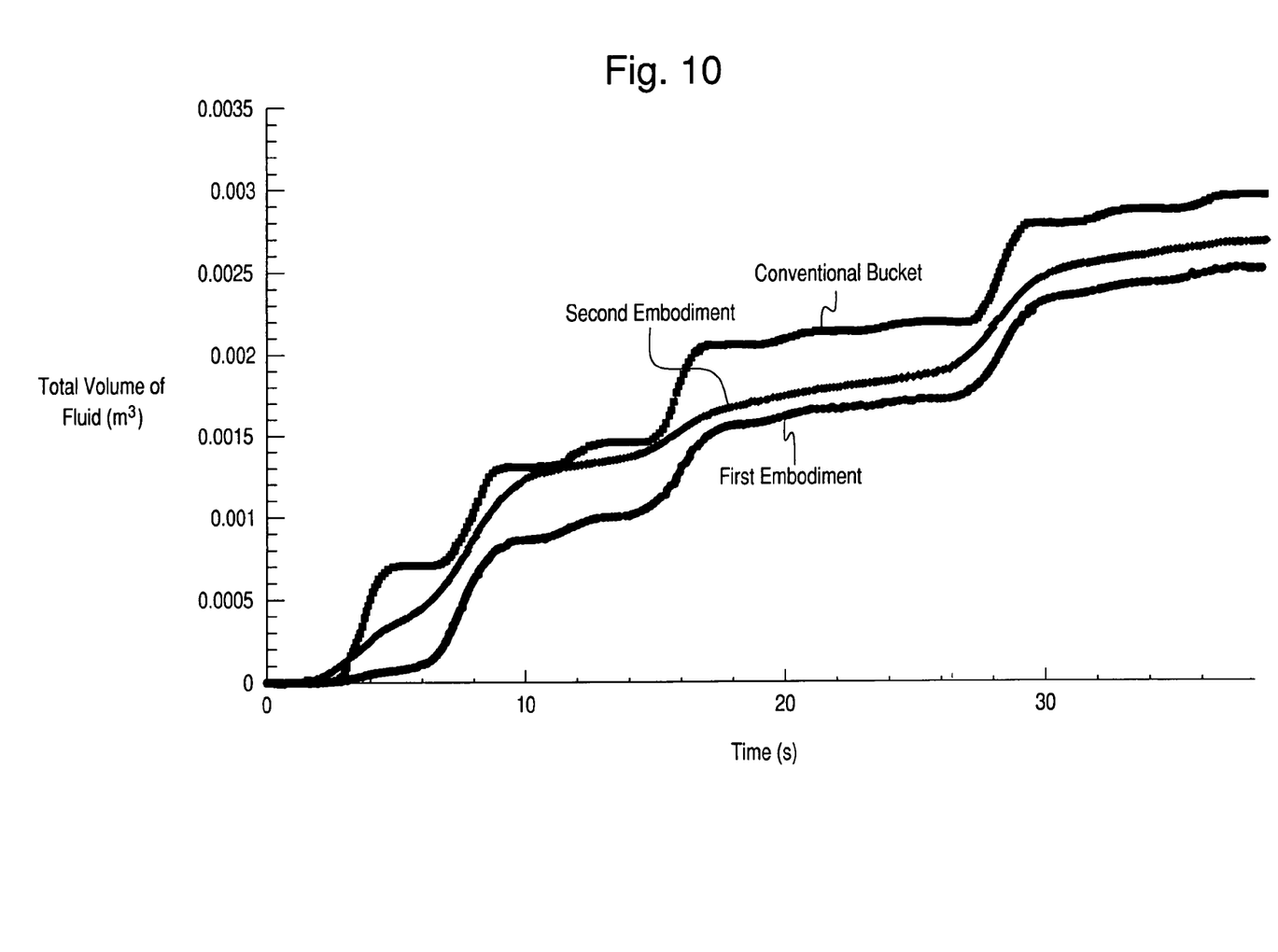
FIG. 10 is graph showing data from a simulation comparing the performance of mop bucket systems at one-half of full capacity.

FIGS. 7 and 9 show the instantaneous volumes of liquid leaving each of the buckets at one-quarter of full capacity and one-half of full capacity, respectively. FIGS. 8 and 10 represent the total volumes of liquid that left each bucket at each interval (sum of instantaneous liquid splashing events) at one-quarter of full capacity and one-half of full capacity, respectively. The total volumes of liquid that left each of the mop bucket system configurations are reproduced in the table below.

|  | Conventional Bucket | Second Embodiment (No Baffles) | First Embodiment |
|---|---|---|---|
| Total Volume of Liquid Leaving Bucket When Tested at One-Quarter of Full Capacity m$^3$ (gal.) | 0.00172 (0.4543759) | 0.00131 (0.3460654) | 0.00102 (0.2668138) |
| Total Volume of Liquid Leaving Bucket When Tested at One-Half of Full Capacity m$^3$ (gal.) | 0.00295 (0.7793076) | 0.00274 (0.7238314) | 0.00253 (0.6683553) |

From the figures and the table, it can be seen that for one-quarter full capacity, the mop bucket system of the first and second embodiments of the present invention outperform the conventional bucket approximately 90-95% and 50% of the time, respectively. The mop bucket system of the first embodiment reduces splashing by 40% over the conventional bucket, and the mop bucket system of the second embodiment reduces splashing by as much as 19% over the conventional bucket. This reduction in splashing is believed to result from breaking the surface tension of the liquid, which prevents wave amplification.

For one-half capacity simulations, the mop bucket system of the first embodiment again outperforms the conventional bucket, although the performance is less predictable qualitatively. The mop bucket system of the first embodiment reduces splashing by 15% over the conventional bucket and the mop bucket system of the second embodiment reduces splashing by 12% over the conventional bucket.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A mop bucket system comprising:
a liquid-retaining portion configured to retain liquid and having a bottom wall portion, a first sidewall portion, a second sidewall portion facing the first sidewall portion, a third sidewall portion, and a fourth sidewall portion facing the third sidewall portion, wherein the liquid-retaining portion permits retained liquid to move in a liquid-movement direction extending from the first sidewall portion toward the second sidewall portion within a higher-momentum region having a width that is approximately 70% of a distance between the third sidewall portion and the fourth sidewall portion; and
an energy-dissipation device disposed within the liquid-retaining portion and extending into the higher-momentum region, the energy-dissipation device being configured to inhibit build up of momentum of liquid in the higher-momentum region along at least a portion of the liquid-movement direction by breaking surface tension of the liquid,
wherein the energy-dissipation device includes a first baffle and a second baffle each disposed between the first and second sidewall portions and within the higher-momentum region,
wherein the first baffle projects from the third sidewall portion and the second baffle projects from the fourth sidewall portion, and wherein the first and second baffles each project such a distance from the respective third and fourth sidewall portions that the first and second baffles are discontinuous in that the first and second baffles do not in combination form a single, uniformly shaped baffle.

2. The mop bucket system of claim 1, wherein the first baffle extends to a height above the bottom wall that is at least 25% of the height of a shortest of the first, second, third, and fourth sidewall portions.

3. The mop bucket system of claim 1, wherein the first baffle extends to a height above the bottom wall that is at least 40% of the height of a shortest of the first, second, third, and fourth sidewall portions.

4. The mop bucket system of claim 1, wherein the first baffle extends to a height above the bottom wall that is at least 50% of the height of a shortest of the first, second, third, and fourth sidewall portions.

5. The mop bucket system of claim 1, wherein the first baffle has a width that is at least approximately 20% of a distance between the third and fourth sidewall portions.

6. The mop bucket system of claim 1, wherein the first baffle has a width that is at least approximately 25% of a distance between the third and fourth sidewall portions.

7. The mop bucket system of claim 1, wherein the first baffle has a width that is at least approximately 35% of a distance between the third and fourth sidewall portions.

8. The mop bucket system of claim 1, wherein each of the first and second baffles extends to a height above the bottom wall that is at least 25% of the height of a shortest of the first, second, third, and fourth sidewall portions.

9. The mop bucket system of claim 1, wherein each of the first and second baffles extends to a height above the bottom wall that is at least 40% of the height of a shortest of the first, second, third, and fourth sidewall portions.

10. The mop bucket system of claim 1, wherein each of the first and second baffles extends to a height above the bottom wall that is at least 50% of the height of a shortest of the first, second, third, and fourth sidewall portions.

11. The mop bucket system of claim 1, wherein each of the first and second baffles has a width that is at least approximately 20% of a distance between the third and fourth sidewall portions.

12. The mop bucket system of claim 1, wherein each of the first and second baffles has a width that is at least approximately 25% of a distance between the third and fourth sidewall portions.

13. The mop bucket system of claim 1, wherein each of the first and second baffles has a width that is at least approximately 35% of a distance between the third and fourth sidewall portions.

14. The mop bucket system of claim 1, wherein the energy-dissipation device includes projections from the second sidewall portion, wherein the projections are disposed within the higher-momentum region.

15. The mop bucket system of claim 14, wherein the projections are configured to distribute energy from retained liquid over a surface of the second sidewall portion.

16. The mop bucket system of claim 14, wherein the projections increase in width in a direction from the first sidewall portion toward the second sidewall portion.

17. The mop bucket system of claim 14, wherein the projections provide a substantially sinusoidal surface along the second sidewall portion.

18. The mop bucket system of claim 14, wherein the projections project at least one inch toward the first sidewall portion.

19. The mop bucket system of claim 14, wherein the projections extend to a height above the bottom wall that is at least 25% of the height of a shortest of the first, second, third, and fourth sidewall portions.

20. The mop bucket system of claim 14, wherein the projections extend to a height above the bottom wall that is at least 40% of the height of a shortest of the first, second, third, and fourth sidewall portions.

21. The mop bucket system of claim 14, wherein the projections extend to a height above the bottom wall that is at least 50% of the height of a shortest of the first, second, third, and fourth sidewall portions.

22. The mop bucket system of claim 1, wherein the energy-dissipation device includes wedges on the second sidewall portion, wherein the wedges are disposed within the higher-momentum region.

23. The mop bucket system of claim 22, wherein the wedges project at least 0.1 inch toward the second sidewall portion.

24. The mop bucket system of claim 22, wherein the wedges extend to a height above the bottom wall that is at least 25% of the height of a shortest of the first, second, third, and fourth sidewall portions.

25. The mop bucket system of claim 22, wherein the wedges extend to a height above the bottom wall that is at least 40% of the height of a shortest of the first, second, third, and fourth sidewall portions.

26. The mop bucket system of claim 22, wherein the wedges extend to a height above the bottom wall that is at least 50% of the height of a shortest of the first, second, third, and fourth sidewall portions.

27. The mop bucket system of claim 1, further comprising rolling members connected to the liquid-retaining portion.

\* \* \* \* \*

UNITED STATES PATENT AND TRADEMARK OFFICE
CERTIFICATE OF CORRECTION

PATENT NO.      : 7,571,831 B2  
APPLICATION NO. : 11/227443  
DATED           : August 11, 2009  
INVENTOR(S)     : Lauer et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 924 days.

Signed and Sealed this

Seventh Day of September, 2010

David J. Kappos  
*Director of the United States Patent and Trademark Office*